(12) United States Patent
Zhu et al.

(10) Patent No.: US 12,285,040 B2
(45) Date of Patent: Apr. 29, 2025

(54) FRUIT SORTING APPARATUS AND METHOD

(71) Applicant: Reemoon Technology Co., Ltd., Jiangxi (CN)

(72) Inventors: Er Zhu, Ganzhou (CN); Yi Zhu, Ganzhou (CN); Haitao Liu, Ganzhou (CN)

(73) Assignee: Reemoon Technology Co., Ltd., Jiangxi (CN)

( * ) Notice: Subject to any disclaimer, the term of this patent is extended or adjusted under 35 U.S.C. 154(b) by 0 days.

(21) Appl. No.: 18/575,210

(22) PCT Filed: May 7, 2022

(86) PCT No.: PCT/CN2022/091411
§ 371 (c)(1),
(2) Date: Dec. 28, 2023

(87) PCT Pub. No.: WO2023/273606
PCT Pub. Date: Jan. 5, 2023

(65) Prior Publication Data
US 2024/0315303 A1    Sep. 26, 2024

(30) Foreign Application Priority Data
Jul. 2, 2021   (CN) .......................... 202110747514.3

(51) Int. Cl.
*A23N 15/00* (2006.01)
*B07C 5/16* (2006.01)
(Continued)

(52) U.S. Cl.
CPC ............... *A23N 15/00* (2013.01); *B07C 5/16* (2013.01); *B07C 5/342* (2013.01); *B07C 5/361* (2013.01);
(Continued)

(58) Field of Classification Search
CPC ...... A23N 2015/008; B07C 5/02; B07C 5/16; B07C 5/34; B07C 5/342; B07C 5/361; B07C 2501/0081; B07C 2501/009
(Continued)

(56) References Cited

U.S. PATENT DOCUMENTS

| 4,586,613 | A | * | 5/1986 | Horii | ..................... | B65G 47/967 |
| | | | | | | 209/912 |
| 9,147,326 | B2 | * | 9/2015 | Kotula | ..................... | G08B 3/10 |
| | | | | | | 340/506 |
| 2013/0299308 | A1 | | 11/2013 | Mimura | | |

FOREIGN PATENT DOCUMENTS

| CN | 106000904 A | 10/2016 |
| CN | 207222383 U | 4/2018 |

(Continued)

OTHER PUBLICATIONS

Hiroshi; Maeda, "Sorting Device for Vegetable and Fruit" (English Translation), Mar. 6, 1992, worldwide.espacenet.com (Year: 1992).*

(Continued)

*Primary Examiner* — Michael McCullough
*Assistant Examiner* — Molly K Devine

(57) ABSTRACT

A fruit sorting apparatus and method are provided. The fruit sorting apparatus includes: a control unit, a conveying assembly, a detection assembly, fruit cups, a plurality of fixing assemblies and a plurality of detection units, wherein the control unit is configured to receive a plurality of pieces of detection information, and match detection information corresponding to a fruit cup of the in-place signal according to a running speed of the conveying assembly, a starting point time of an in-place signal, the distance between the detection unit and the detection assembly and time information of the detection information.

15 Claims, 6 Drawing Sheets

(51) Int. Cl.
*B07C 5/342* (2006.01)
*B07C 5/36* (2006.01)

(52) U.S. Cl.
CPC .. *A23N 2015/008* (2013.01); *B07C 2501/009* (2013.01)

(58) Field of Classification Search
USPC .......................................................... 209/509
See application file for complete search history.

(56) References Cited

FOREIGN PATENT DOCUMENTS

| | | | | | |
|---|---|---|---|---|---|
| CN | 207379916 | U | | 5/2018 | |
| CN | 108906653 | A | | 11/2018 | |
| CN | 109772757 | A | | 5/2019 | |
| CN | 109794437 | A | | 5/2019 | |
| CN | 111122488 | A | * | 5/2020 | ............. G01N 21/35 |
| CN | 111389753 | A | | 7/2020 | |
| CN | 111570331 | A | | 8/2020 | |
| CN | 113333303 | A | | 9/2021 | |
| CN | 215142231 | U | | 12/2021 | |
| JP | H0471673 | A | * | 3/1992 | ............... B07C 5/10 |
| JP | 2013176769 | A | * | 9/2013 | ............... B07C 7/04 |
| KR | 20010038018 | A | | 5/2001 | |
| KR | 100344579 | B1 | | 8/2002 | |
| WO | 2012/039597 | A2 | | 3/2012 | |

OTHER PUBLICATIONS

Li; Jiangbo, "Grading System and Method for Detecting Internal Quality of Fruits" (English Translation), May 8, 2020, worldwide. espacenet.com (Year: 2020).*

Chinese Office Action dated Dec. 9, 2024 in connection with Chinese Application No. 202110747514.3.

Supplementary European Search Report dated Sep. 5, 2024 in connection with European Application No. 22831433.2.

International Search Report and Written Opinion mailed Jul. 25, 2022 in connection with International Application No. PCT/CN2022/091411.

* cited by examiner

FRUIT SORTING APPARATUS AND METHOD

CROSS-REFERENCE TO RELATED APPLICATION

This application is a 35 U.S.C. § 371 National Phase filing of International Application No. PCT/CN2022/091411, filed on May 7, 2022, entitled "FRUIT SORTING APPARATUS AND METHOD," which claims priority to and the benefit of Chinese Patent Application No. 202110747514.3, filed with the China National Intellectual Property Administration on Jul. 2, 2021 and entitled "FRUIT SORTING APPARATUS AND METHOD." The contents of these applications are incorporated herein by reference in their entirety.

TECHNICAL FIELD

The present disclosure relates to the technical field of fruit sorting, and specifically, to a fruit sorting apparatus and method.

BACKGROUND

Fruit sorting apparatuses are widely used in the field of fruit sorting. Fruit cups are fixed on a conveying mechanism, and the fruit cups are driven by the conveying mechanism to sequentially pass through different detection units, so as to detect the visual, weighing and internal quality and other data of the fruit. Since the detection units are sequentially arranged on the conveying mechanism, a plurality of fruit cups sequentially pass through the multiple detection units under the driving of the conveying mechanism. After the detection unit detects data, the data are transmitted to a control unit, and the control unit finally integrates the data. For a single detection unit, data of a plurality of fruit cups are detected. In order to identify data of different fruit cups, barcodes are usually pasted on the fruit cups, and data integration is performed by scanning the barcodes so as to achieve multiple sorting. However, this method is cumbersome to operate, and if the fruit cup is lost between the two detection units, this method will cause disorder in the data integration of the subsequent detection units. That is to say, the current fruit sorting apparatus is prone to data disorder during the fruit sorting process, resulting in poor final sorting precision.

SUMMARY

The present disclosure provides a fruit sorting apparatus and method, which can match a plurality of pieces of detection information with fruit cups after receiving the detection information of the fruit cups detected by a detection unit, and reduce disorder of subsequent data as much as possible, thereby improving the precision of fruit sorting.

Embodiments of the present disclosure are implemented as follows.

Some embodiments of the present disclosure provide a fruit sorting apparatus for sorting fruit. The fruit sorting apparatus may include: a control unit, a conveying assembly, a detection assembly, a fruit cup, a plurality of fixing assemblies, and a plurality of detection units;
the fruit cup may be configured to accommodate fruit;
the fixing assembly may be configured to fix the fruit cup;
the detection assembly may be arranged at an input end of the conveying assembly, and the detection assembly may be connected to the control unit and is configured to detect an in-place signal when the fixing assembly moves to the input end and send the in-place signal carrying a start point time to the control unit;
the plurality of fixing assemblies may be sequentially mounted on the conveying assembly, and drive the plurality of fruit cups to sequentially pass through the plurality of detection units under the action of the conveying assembly;
the plurality of detection units may be connected to the control unit, and the detection unit may be configured to collect detection information of the fruit cup once every preset time interval and send the detection information carrying time information to the control unit; and
the control unit is configured to be connected to the detection unit and the detection assembly, and is configured to receive a plurality of pieces of detection information and match the detection information corresponding to the fruit cup of the in-place signal according to a running speed of the conveying assembly, the start point time of the in-place signal, a distance between the detection unit and the detection assembly, and time information of the detection information.

In the embodiment of the present disclosure, fruit is placed in the fruit cup, the fruit cup is fixed on the fixing assembly, and under the action of the conveying assembly, the fixing assembly drives the fruit cup to sequentially pass through a plurality of detection units arranged in an extension direction of the conveying assembly. A position where the input end and the fruit cup are placed at the fixing assembly may be considered as a start point of the fruit cup moving on the conveying assembly. Acquiring the in-place signal of the fixing assembly moving to the input end may be regarded as acquiring a start point time of the fixing assembly driving the fruit cup to move on the conveying assembly. The detection information that corresponds to the fruit cup of the in-place signal and that is detected at the detection unit may be matched according to the start point time, the running speed and the distance between the detection unit and the detection assembly. In the embodiment of the present disclosure, according to the start point time, the running speed, the distance between the detection unit and the detection assembly, and time information, it is possible to realize matching between the fruit cup and detection information, realizing one-to-one correspondence between a plurality of pieces of detection information and a plurality of fruit cups, so as to avoid the influence of the loss of fruit cups on subsequent sorting, and reduce the problem of disorder of subsequent data as much as possible, thereby improving the precision of fruit sorting.

In an optional embodiment of the present disclosure, the control unit may be further configured to calculate a movement time of the fixing assembly driving the fruit cup to move from the detection assembly to the detection unit according to the running speed and the distance between the detection unit and the detection assembly, calculate an end point time of the fixing assembly moving to the detection unit according to the start point time of the in-place signal and the movement time, and match detection information whose time information is the same as the end point time.

In the embodiment of the present disclosure, according to the start point time, the running speed, the distance between the detection unit and the detection assembly, and time information, it is possible to realize matching between the fruit cup and detection information, realizing one-to-one correspondence between a plurality of pieces of detection information and a plurality of fruit cups, so as to avoid the influence of the loss of fruit cups on subsequent sorting, and reduce the problem of disorder of subsequent data as much as possible, thereby improving the precision of fruit sorting.

In an optional embodiment of the present disclosure, if there is the detection information matching the end point time among the plurality of pieces of detection information, the detection information may be recorded into detection data of the fruit cup corresponding to the in-place signal.

The detection unit collects one piece of detection information every preset time interval and sends the detection information carrying time information to the control unit. The control unit matches detection information that is the same as the end point time among a plurality of pieces of detection information. If there is the detection information that is the same as the end point time, the detection information is detection data of the fruit cup, and the detection information is recorded in the detection data of the fruit cup.

In an optional embodiment of the present disclosure, if there is no detection information matching the end point time among the plurality of pieces of detection information, the detection data of the fruit cup corresponding to the in-place signal is discarded.

If there is no detection information matching the end point time among the plurality of pieces of detection information, the fruit cup may be lost in the process of moving to the detection unit, or the fruit cup is not lost, but the detection unit does not detect the detection information of the fruit cup, which indicates that there is no detection information of the fruit cup among the plurality of pieces of detection information, so that the detection data of the fruit cup is discarded, and the next sorting work is not performed.

In an optional embodiment of the present disclosure, the conveying assembly may include a transmission chain and a driving wheel, the transmission chain may be in transmission connection with the driving wheel, and the plurality of fixing assemblies may be sequentially mounted on the transmission chain.

A plurality of fixing assemblies may be evenly spaced and mounted on the transmission chain, and under the drive of driving wheel, the transmission chain can drive the fruit cups fixed on the fixing assemblies to pass through a plurality of detection units sequentially. The transmission performed by the driving wheel and transmission chain can increase the stability of conveying assembly in the transmission process, and reduce the slipping problem of transmission assembly in the transmission process.

In an optional embodiment of the present disclosure, the transmission chain may include a first transmission chain and a second transmission chain, an end that is of the first transmission chain and that is far away from the input end may be coaxially arranged with an end of the second transmission chain, the second transmission chain may include a first chain and a second chain, and the first chain and the second chain may be arranged in parallel and spaced apart to form a gap.

The first transmission chain and the second transmission chain are coaxially arranged, so that the first transmission chain and the second transmission chain may be driven simultaneously by the same driving wheel, and the first transmission chain and the second transmission chain can synchronously move. The second transmission chain includes a first chain and a second chain, so that the second transmission chain achieves transmission in a double-chain mode. A gap is formed between the first chain and the second chain, so that the fruit cup placed on the fixing assembly may be exposed outside, and the detection unit below the fruit cup can conveniently detect information.

In an optional embodiment of the present disclosure, the detection unit includes a quality module, and the quality module is arranged below the gap.

The quality module is arranged below a gap formed by the first chain and the second chain. The quality module may be mainly configured to receive a spectrum of a light source after passing through the fruit cup, and the light source may be arranged above the fruit cup. Receiving the spectrum from the bottom of the fruit cup allows the fruit to fit well with the soft skin in the fruit cup, blocking most of the non-transmitted light, thereby reducing the influence of the non-transmitted light on the spectrum of the transmitted fruit. If the quality module is arranged above or on a side surface of the fruit cup, more natural light and diffuse reflection light enter the quality module, and the detection precision of the quality module is influenced.

In an optional embodiment of the present disclosure, a bottom of the fruit cup is provided with a detection hole, and the detection hole is arranged corresponding to the gap.

In order to improve the accuracy of the quality module for receiving the spectrum, the detection hole is arranged in the bottom of the fruit cup, so that the light transmission may be increased, and the phenomenon that the intensity of the spectrum received by the quality module is weakened due to thicker fruit cups is avoided.

In an optional embodiment of the present disclosure, the transmission chain may further include a third transmission chain, and an end of the third transmission chain may be arranged coaxially with an end that is of the second transmission chain and that is far away from the first transmission chain.

The third transmission chain may also be a single chain, and a main purpose of providing the second transmission chain is to receive the spectrum from below the fruit cup. Since the double-chain mode is more costly than the single-chain mode, only the double-chain mode is used for transmission at the detection of the quality module.

In an optional embodiment of the present disclosure, the detection unit may further include a vision module and a weighing module, and the vision module and the weighing module may be arranged below the first transmission chain.

The vision module may be mainly configured to collect image information of fruit, and the weighing module may be mainly configured to weigh fruit.

In an optional embodiment of the present disclosure, the fruit sorting apparatus may further include a sorting module, and the sorting module may be arranged below the third transmission chain.

The sorting module may be mainly configured to obtain the overall data of the fruit after integrating the data of the quality module, the vision module and the weighing module, and then sort the grades of the fruit according to the integrated overall data.

In an optional embodiment of the present disclosure, the fixing assembly may include a mounting plate and a stopper, the mounting plate may be mounted on the conveying assembly, the stopper may be connected to the mounting plate, and the stopper can abut against the fruit cup, so that the fruit cup moves under the driving of the conveying assembly.

The mounting plate may be mounted on the second transmission chain, and the stopper may be mainly configured to abut against the fruit cup, thereby driving the fruit cup to move on the second transmission chain.

In an optional embodiment of the present disclosure, the stopper may have a stop surface, and the stop surface may abut against the fruit cup.

During the transition of the fruit cup from the first transmission chain to the second transmission chain, the stop surface gradually abuts against the fruit cup, thereby pushing the fruit cup to move on the second transmission chain.

In an optional embodiment of the present disclosure, a shape of the stop surface may be adapted to that of the fruit cup.

The shape of the stop surface is adapted to the shape of the fruit cup, which can ensure that the stop surface and the fruit cup can fit perfectly, improve the transmission stability of the fruit cup during the transmission process, and reduce the sliding of the fruit cup due to local contact between the stop surface and the fruit cup.

In an optional embodiment of the present disclosure, the fixing assembly may include a bottom plate and a baffle plate, the bottom plate may be mounted on the conveying assembly, the baffle plate may be connected to the bottom plate, the baffle plates and the bottom plates of two adjacent fixing assemblies may form a fixing cavity, and the fruit cup may be mounted in the fixing cavity.

In the process of conveying the fruit cups by the first transmission chain or the third transmission chain, the bottom plate is mainly configured to bear the fruit cups, the baffle plates of two adjacent first fixing members limit the fruit cups from the front and the back of the fruit cups, and the fruit cups may be ensured to run on the first transmission chain or the third transmission chain.

In an optional embodiment of the present disclosure, the detection assembly may include a detection switch and a detection tray, the detection tray may be arranged coaxially with the conveying assembly, a plurality of detection ports may be arranged on the detection tray, the number of the detection ports may be the same as that of the fixing assemblies, and the detection switch may detect an in-place signal indicating that the fixing assembly moves to the input end under a condition that the detection port moves to a position corresponding to the detection switch.

The detection switch may be photoelectric switch, and when the detection port rotates to a detection port, the signal sent by the photoelectric switch can be emitted from the detection port. When the detection tray rotates to a gap between the two detection ports, the photoelectric switch can receive a feedback signal. Therefore, it can be determined whether a detection port passes through the detection switch, and whether the detection port moves to the detection switch, thereby determining whether the fixing assembly moves to the input end.

Some other embodiments of the present disclosure provide a fruit sorting method applied to a fruit sorting apparatus, where the fruit sorting apparatus may include a conveying assembly, a fruit cup, a plurality of fixing assemblies and a plurality of detection units, the plurality of fixing assemblies are sequentially mounted on the conveying assembly, the plurality of detection units are arranged corresponding to the conveying assembly, and the fruit sorting method may include the following steps:

acquiring an in-place signal carrying time information when the fixing assembly moves to an input end;
acquiring a running speed of the conveying assembly;
acquiring detection information that carries time information and is collected by the detection unit every preset time interval;
acquiring a distance between the detection assembly and the detection unit; and
matching the detection information corresponding to the fruit cup of the in-place signal according to a running speed of the conveying assembly, the time information of the in-place signal, a distance between the detection unit and the detection assembly, and time information of the detection information.

According to the start point time, the running speed, the distance between the detection unit and the detection assembly, and time information, it is possible to realize matching between the fruit cup and detection information, realizing one-to-one correspondence between a plurality of pieces of detection information and a plurality of fruit cups, so as to avoid the influence of the loss of fruit cups on subsequent sorting, and reduce the problem of disorder of subsequent data as much as possible, thereby improving the precision of fruit sorting.

In an optional embodiment of the present disclosure, the step of matching the detection information corresponding to the in-place signal according to a running speed of the conveying assembly, the time information of the in-place signal, a distance between the detection unit and the detection assembly and time information of the detection information may include:

calculating a movement time of the fixing assembly driving the fruit cup to move from the detection assembly to the detection unit according to the running speed and the distance between the detection unit and the detection assembly;
calculating an end point time of the fruit cup driven by the fixing assembly to move from the detection assembly to the detection unit according to the time information of the in-place signal and the movement time; and
matching the detection information that is the same as the end point time among the plurality of pieces of detection information.

In the embodiment of the present disclosure, according to the start point time, the running speed, the distance between the detection unit and the detection assembly, and time information, it is possible to realize matching between the fruit cup and detection information, realizing one-to-one correspondence between a plurality of pieces of detection information and a plurality of fruit cups, so as to avoid the influence of the loss of fruit cups on subsequent sorting, and reduce the problem of disorder of subsequent data as much as possible, thereby improving the precision of fruit sorting.

In an optional embodiment of the present disclosure, the step of matching the detection information that is the same as the end point time among the plurality of pieces of detection information may include:

judging whether there is detection information that is the same as the end point time among the plurality of pieces of detection information; and
if there is the detection information, recording the detection information that is the same as the end point time into the detection data of the fruit cup corresponding to the in-place signal.

The detection unit collects one piece of detection information every preset time interval and sends the detection information carrying time information to the control unit. The control unit matches detection information that is the same as the end point time among a plurality of pieces of detection information. If there is the detection information that is the same as the end point time, the detection information is detection data of the fruit cup, and the detection information is recorded in the detection data of the fruit cup.

In an optional embodiment of the present disclosure, the step of matching the detection information that is the same as the end point time among the plurality of pieces of detection information may include:

if there is no detection information, discarding the detection data of the fruit cup corresponding to the in-place signal.

If there is no detection information matching the end point time among the plurality of pieces of detection information, the fruit cup may be lost in the process of moving to the detection unit, or the fruit cup is not lost, but the detection unit does not detect the detection information of the fruit cup, which indicates that there is no detection information of the fruit cup among the plurality of pieces of detection information, so that the detection data of the fruit cup is discarded, and the next sorting work is not performed.

BRIEF DESCRIPTION OF DRAWINGS

In order to more clearly illustrate the technical solutions of embodiments of the present disclosure, the drawings required in the embodiments will be briefly described below. It should be understood that the following drawings only illustrate some embodiments of the present disclosure and therefore should not be considered as limitations of the scope, and for those of ordinary skill in the art, other related drawings can be obtained according to these drawings without creative efforts.

Figure 1:
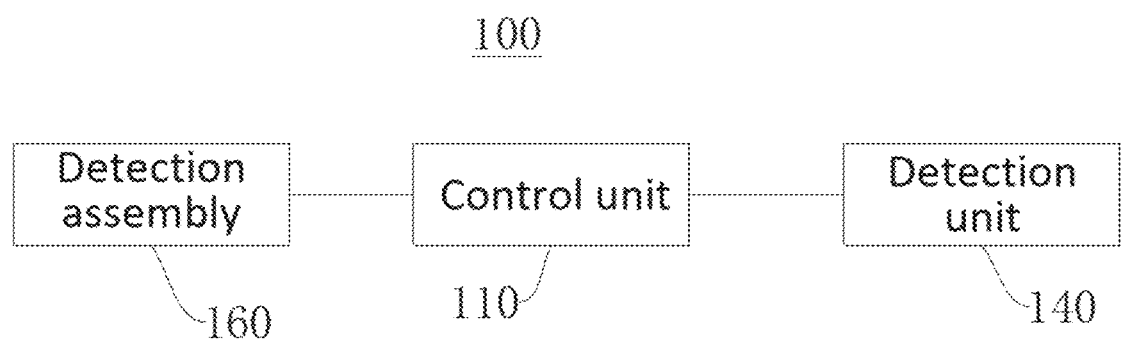
FIG. 1 is a block diagram of a fruit sorting apparatus provided by an embodiment of the present disclosure.

Reference numerals: 100: fruit sorting apparatus; 110: control unit; 120: conveying assembly; 122: driving wheel; 124: transmission chain; 1242: first transmission chain; 1244: second transmission chain; 1245: first chain; 1246: second chain; 1248: third transmission chain; 130: fruit cup; 132: detection hole; 140: detection unit; 142: quality module; 144: vision module; 146: weighing module; 148: sorting module; 150: fixing assembly; 152: first fixing member; 1521: bottom plate; 1523: baffle plate; 154: second fixing member; 1542: mounting plate; 1544: stopper; 1546: stop surface; 1548: connecting plate; 160: detection assembly; 162: detection switch; 164: detection tray; 166: detection port; and 170: light source.

DETAILED DESCRIPTION OF EMBODIMENTS

In order to make the objectives, technical solutions, and advantages of embodiments of the present disclosure clearer, the following clearly and completely describes the technical solutions in embodiments of the present disclosure with reference to the accompanying drawings in embodiments of the present disclosure. It is clear that the described embodiments are merely some rather than all of embodiments of the present disclosure. The assemblies of embodiments of the present disclosure, as generally described and illustrated in the figures herein, can be arranged and designed in a wide variety of different configurations.

Therefore, the following detailed description of embodiments of the present disclosure provided in the accompanying drawings is not intended to limit the scope of the present disclosure as claimed, but is merely representative of selected embodiments of the present disclosure. All other embodiments obtained by those of ordinary skill in the art based on embodiments of the present disclosure without creative efforts shall fall within the protection scope of the present disclosure.

It should be noted that similar reference numerals and letters indicate similar items in the following drawings, and therefore, once an item is defined in one of the drawings, no further definition or explanation is required in the following drawings.

In the description of the present disclosure, it should be noted that an orientation or position relationship indicated by terms "upper", "lower", "inner", "outer", or the like is an orientation or position relationship based on the accompanying drawings, or an orientation or position relationship that the product of the present disclosure is usually placed when in use. These terms are merely used to facilitate and simplify description of the present disclosure, instead of indicating or implying that a mentioned apparatus or element must have a specific orientation or be constructed and operated in a specific orientation, and therefore the terms cannot be construed as a limitation on the present disclosure.

In addition, the terms "first", "second", and the like are merely intended for differentiated description, and should not be construed as an indication or an implication of relative importance.

It should be noted that the features in the embodiments of the present disclosure can be combined with each other without conflict.

The fruit sorting apparatus and method provided by the embodiments of the present disclosure can match a plurality of pieces of detection information with fruit cups after receiving the detection information of the fruit cups detected by detection units, and reduce disorder of subsequent data as much as possible, thereby improving the precision of fruit sorting.

An embodiment of the present disclosure will now be described, referring to FIGS. 1 and 2, this embodiment provides a fruit sorting apparatus 100. The fruit sorting apparatus 100 provided in this embodiment may be mainly configured to sort fruit, and after receiving detection information of a fruit cup 130 detected by a detection unit 140, the fruit sorting apparatus 100 provided in this embodiment can match a plurality of pieces of detection information with the fruit cup 130, so as to reduce the problem of disorder of subsequent data as much as possible, thereby improving the precision of fruit sorting.

In this embodiment, the fruit sorting apparatus 100 may include: a control unit 110, a conveying assembly 120, a detection assembly 160, a fruit cup 130, a plurality of fixing assemblies 150 and a plurality of detection units 140, where the fruit cup 130 can be configured to accommodate fruit, and the fixing assembly 150 may be configured to fix the fruit cup 130.

The detection assembly 160 may be arranged at an input end of the conveying assembly 120, and the detection assembly 160 may be connected to the control unit 110 and is configured to detect an in-place signal when the fixing assembly 150 moves to the input end and send the in-place signal carrying a start point time to the control unit 110. The plurality of fixing assemblies 150 may be sequentially mounted on the conveying assembly 120, and drive the plurality of fruit cups 130 to sequentially pass through the plurality of detection units 140 under the action of the conveying assembly 120. The plurality of detection units 140 may be connected to the control unit 110, and the detection unit 140 may be configured to collect detection information of the fruit cup 130 once every preset time interval and send the detection information carrying time information to the control unit 110.

The control unit 110 may be configured to be connected to the detection unit 140 and the detection assembly 160, and is configured to receive a plurality of pieces of detection information and match the detection information corresponding to the fruit cup 130 of the in-place signal according to a running speed of the conveying assembly 120, the start point time of the in-place signal, a distance between the detection unit 140 and the detection assembly 160, and time information of the detection information.

In this embodiment, fruit is placed in the fruit cup 130, the fruit cup 130 may be fixed on the fixing assembly 150, and under the action of the conveying assembly 120, the fixing assembly 150 may drive the fruit cup 130 to sequentially pass through a plurality of detection units 140 arranged in an extension direction of the conveying assembly 120. A position at which the fruit cup 130 is placed on the input end by the fixing assembly 150 may be considered a start point of the fruit cup 130 moving on the conveying assembly 120. Acquiring the in-place signal of the fixing assembly 150 moving to the input end may be regarded as acquiring a start point time of the fixing assembly 150 driving the fruit cup 130 to move on the conveying assembly 120. The detection information that corresponds to the fruit cup 130 of the in-place signal and that is detected at the detection unit 140 may be matched according to the start point time, the running speed and the distance between the detection unit 140 and the detection assembly 160. In this embodiment, according to the start point time, the running speed, the distance between the detection unit 140 and the detection assembly 160, and time information, it is possible to realize matching between the fruit cup 130 and detection information, realizing one-to-one correspondence between a plurality of pieces of detection information and a plurality of fruit cups 130, so as to avoid the influence of the loss of fruit cups 130 on subsequent sorting, and reduce the problem of disorder of subsequent data as much as possible, thereby improving the precision of fruit sorting.

It is easily understood that a plurality of detection units 140 are provided, and the control unit 110 processes the detection information detected by the same detection unit 140 in the same manner after receiving the detection information of the same detection unit 140, so as to realize multiple sorting of the fruit.

The running speed may be preset, or the control unit 110 may obtain the running speed directly from the conveying assembly 120. In general, in order to facilitate the collection of the detection information by the detection unit 140, the conveying assembly 120 generally moves at a constant speed, that is, the running speed is a constant value. When the entire fruit sorting apparatus 100 is started, the control unit 110 may control the conveying assembly 120 to convey the fruit cup 130 at the running speed according to the starting instruction. The control unit 110 may also directly detect the running speed of the conveying assembly 120 after the fruit sorting apparatus 100 is started. The plurality of fixing assemblies 150 are evenly spaced and arranged on the conveying assembly 120, an interval time between two adjacent fixing assemblies 150 passing through the detection unit 140 may be calculated according to the running speed of the conveying assembly 120 and the distance between the two adjacent fixing assemblies 150, and the interval time may be set to a preset time, that is to say, the detection unit 140 collects detection information once when each fixing assembly 150 moves to the detection unit 140.

For example, the running speed is 20 mm/s, a space between two adjacent fixing assemblies 150 is 40 mm, and the interval time calculated according to the running speed and the distance between two adjacent fixing assemblies 150 is 2 s. For a single detection unit 140, detection information is acquired every 2 s.

Of course, in order to improve the detection effect of the detection unit 140, the preset time may be smaller than the interval time, as long as the interval time is an integer multiple of the preset time, that is to say, the preset time can be one-half, one-third and the like of the interval time. That is, the interval time can be 1 s, 0.5 s, and the like.

The plurality of fixing assemblies 150 are evenly arranged on the conveying assembly 120, and the distance between the detection assembly 160 and the detection unit 140 can be calculated according to the number of the fixing assemblies 150 between the detection assembly 160 and the detection unit 140.

For convenience of understanding, the detection unit 140 closest to the detection assembly 160 is specifically described as an example. For example, when the fixing assembly 150 moves to the detection assembly 160, the current fixing assemblies 150 are numbered, and the numbering sequence of the plurality of fixing assemblies 150 is separately No. 1, No. 2, No. 3, No. 4, No. 5, No. 6 and so on according to the sequence passing through the detection assembly 160. When the distance between the detection assembly 160 and the detection unit 140 is calculated, the current detection assembly 160 detects the in-place signal of one fixing assembly 150, and records the fixing assembly 150 currently at the detection assembly 160 as No. 6. When the current fixing assembly 150 numbered as No. 3 moves to the detection unit 140, there are 3 intervals between the detection assembly 160 and the detection unit 140, and the distance between the detection assembly 160 and the detection unit 140 is 3 times 40 mm to obtain 120 mm.

In this embodiment, the in-place signal carrying the start point time may refer to a time point when the detection assembly 160 detects the in-place signal of the fixing assembly 150 and records the detected in-place signal, and the time point when the in-place signal is detected is the start point time of the in-place signal.

For example, when the start of the fruit sorting apparatus 100 is at the moment of 0, the detection assembly 160 just detects an in-place signal, and the start point time of the in-place signal is 0. The in-place signal carrying the start point time is: 0 s-signal 1. Since the fixing assemblies 150 are evenly arranged on the conveying assembly 120, the in-place signals carrying the start point time detected by the detection assembly are: 0 s-signal 1, 2 s-signal 2, 4 s-signal 3, 6 s-signal 4, and so on.

The detection information carrying time information may mean that the detection unit 140 simultaneously records the time point when the detection information is detected when detecting the detection information of the fruit cup 130, then the time point when the detection information is detected is the time information of the detection information. For convenience of understanding, the detection unit 140 closest to the detection assembly 160 is specifically described as an example, for example, in the process of acquiring the detection information once every preset time interval, the detection unit 140 records the detection information and records the time when the detection information is received, and sends the detection information to the control unit 110. The detection information received by the control unit is: 0 s-information 1, 2 s-information 2, 4 s-information 3, 6 s-information 4 and so on.

In this embodiment, the control unit 110 may be further configured to calculate a movement time of the fixing assembly 150 driving the fruit cup 130 to move from the detection assembly 160 to the detection unit 140 according to the running speed and the distance between the detection unit 140 and the detection assembly 160, calculate an end point time of the fixing assembly 150 moving to the detection unit 140 according to the start point time of the in-place signal and the movement time, and match detection information whose time information is the same as the end point time.

In this embodiment, after the running speed of the conveying assembly 120 is obtained, the movement time required for the fixing assembly 150 to move from the input end to the detection unit 140 can be calculated according to the running speed and the distance between the detection unit 140 and the detection assembly 160, the end point time for the fixing assembly 150 to move to the detection unit 140 can be calculated according to the start point time obtained by the fixing assembly 150 at the input end, the end point time can be obtained by adding the movement time to the start point time, and the detection information whose time information is the same as the end point time can be matched among a plurality of pieces of detection information according to the end point time, where the detection information is the detection information of the fruit cup 130 detected by the detection unit 140 when the fixing assembly 150 moves to the detection unit 140.

In this embodiment, if there is the detection information matching the end point time among the plurality of pieces of detection information, the detection information may be recorded into detection data of the fruit cup 130 corresponding to the in-place signal.

The detection unit 140 may collect one piece of detection information every preset time interval and send the detection information carrying time information to the control unit 110. The control unit 110 matches detection information that is the same as the end point time among a plurality of pieces of detection information. If there is the detection information that is the same as the end point time, the detection information is detection data of the fruit cup 130, and the detection information is recorded in the detection data of the fruit cup 130.

In this embodiment, if there is no detection information matching the end point time among the plurality of pieces of detection information, the detection data of the fruit cup 130 corresponding to the in-place signal is discarded.

If there is no detection information matching the end point time among the plurality of pieces of detection information, the fruit cup 130 may be lost in the process of moving to the detection unit 140, or the fruit cup 130 is not lost, but the detection unit 140 does not detect the detection information of the fruit cup 130, which indicates that there is no detection information of the fruit cup 130 among the plurality of pieces of detection information, so that the detection data of the fruit cup 130 is discarded, and the next sorting work is not performed.

It is easily understood that, in this embodiment, a plurality of detection units 140 may be provided, and the control unit 110 performs matching according to the above method after receiving the detection data from the same detection unit 140.

In order to facilitate understanding the process of matching the detection information with the fruit cup 130, any fruit cup 130 that is fixed on the fixing assembly 150 and passes through the detection unit 140 closest to the detection assembly 160 under the driving of the conveying assembly 120 is taken as an example for specific description. After the fruit sorting apparatus 100 is started, the detection unit 140 detects a plurality of pieces of detection information having time information, which are: 0 s-information 1, 2 s-information 2, 4 s-information 3, 6 s-information 4, 8 s-information 5, 10 s-information 6, 12 s-information 7, 14 s-information 8, and so on.

When the corresponding fixing assembly 150 is applied to the detection assembly 160, the detection assembly 160 detects that the in-place signal carrying the start point time is 6 s-signal 4. The movement time can be calculated to be 6 s according to the running speed of 20 mm/s and the distance between the detection unit 140 and the detection assembly 160 of 120 mm. Then, the time information is calculated to be 12 s according to the start point time of 6 s plus the movement time of 6 s detected by the detection assembly 160. Then, whether there is detection information having time information of 12 s is matched again among the detection information having time information detected by the detection unit 140. If it is found from the matching that there is detection information of 12 s-information 7, the information 7 is the detection information of the fruit cup 130, and the information 7 is recorded in the detection data of the fruit cup 130.

Similarly, when the fruit cup 130 passes through the other detection units 140, the calculation process is the same as the above. Since the positions of the different detection units 140 are different from that of the different detection assemblies 160, the calculated movement time is different, and the above matching detection information can be referred.

Figure 2:
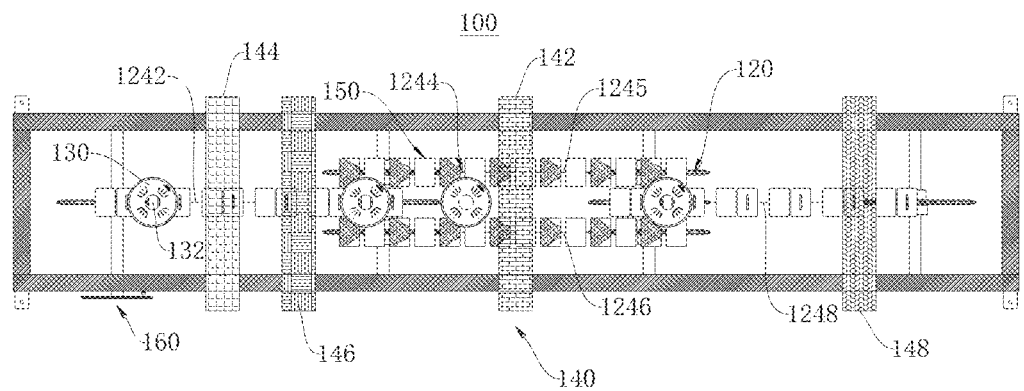
FIG. 2 is a schematic diagram of a structure of a fruit sorting apparatus provided by an embodiment of the present disclosure from a first perspective.
Figure 3:
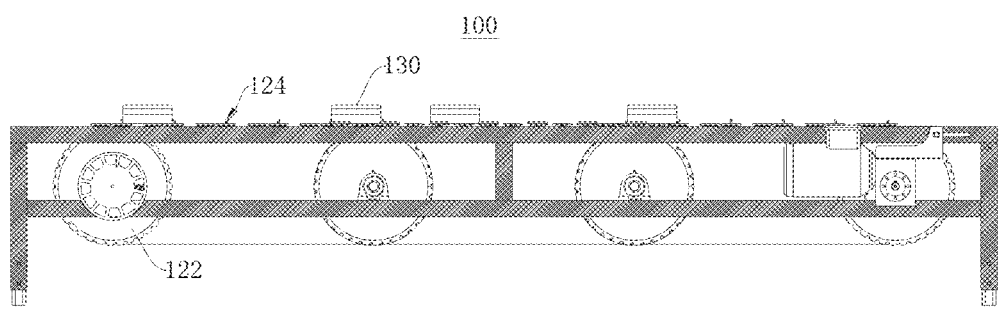
FIG. 3 is a schematic diagram of a structure of a fruit sorting apparatus provided by an embodiment of the present disclosure from a second perspective.

Referring to FIGS. 2 and 3, in this embodiment, he conveying assembly 120 may include a transmission chain 124 and a driving wheel 122, the transmission chain 124 may be in transmission connection with the driving wheel 122, and the plurality of fixing assemblies 150 may be sequentially mounted on the transmission chain 124.

In this embodiment, the plurality of fixing assemblies 150 may be evenly spaced and mounted on the transmission chain 124, and under the drive of driving wheel 122, the transmission chain 124 can drive the fruit cups 130 fixed on the fixing assemblies 150 to pass through a plurality of detection units 140 sequentially. The transmission performed by the driving wheel 122 and transmission chain 124 can increase the stability of conveying assembly 120 in the transmission process, and reduce the slipping problem of transmission assembly 120 in the transmission process.

In this embodiment, the transmission chain 124 may include a first transmission chain 1242 and a second transmission chain 1244, an end that is of the first transmission chain 1242 and that is far away from the input end may be coaxially arranged with an end of the second transmission chain 1244, the second transmission chain 1244 may include a first chain 1245 and a second chain 1246, and the first chain 1245 and the second chain 1246 may be arranged in parallel and spaced apart to form a gap.

In this embodiment, the first transmission chain 1242 and the second transmission chain 1244 are coaxially arranged, so that the first transmission chain 1242 and the second transmission chain 1244 may be driven simultaneously by the same driving wheel 122, the first transmission chain 1242 and the second transmission chain 1244 can move synchronously, and sorting of different functions of fruit can be achieved.

The second transmission chain 1244 includes a first chain 1245 and a second chain 1246, the second transmission chain 1244 achieves transmission in a double-chain mode, and a gap is formed between the first chain 1245 and the second chain 1246, so that the fruit cup 130 placed on the fixing assembly 150 may be exposed outside, and the detection unit 140 below the fruit cup can conveniently detect information.

In this embodiment, the first transmission chain 1242 may achieve transmission by a single-chain mode, and the second transmission chain 1244 may achieve transmission by a double-chain mode, and the fixing assembly 150 of the first transmission chain 1242 is different from the fixing assembly 150 of the second transmission chain 1244 because the first transmission chain 1242 and the second transmission chain 1244 are in different structures.

Figure 4:
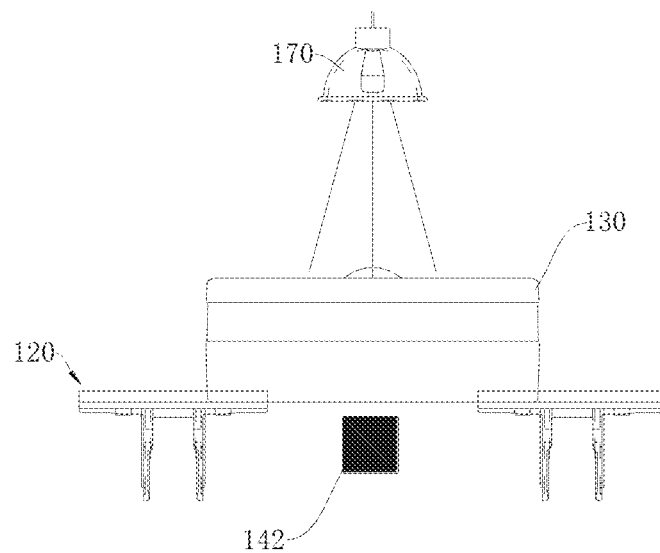
FIG. 4 is a schematic diagram of positions of a fruit cup, a quality module and a light source provided by an embodiment of the present disclosure.

Referring to FIG. 4, in this embodiment, the detection unit 140 May include a quality module 142, and the quality module 142 may be arranged below the gap.

In this embodiment, the quality module 142 is arranged below a gap formed by the first chain 1245 and the second chain 1246, the quality module 142 may be mainly configured to receive a spectrum of a light source 170 after passing through the fruit cup 130, and the light source 170 may be arranged above the fruit cup 130. Receiving the spectrum from the bottom of the fruit cup 130 allows the fruit to fit well with the soft skin in the fruit cup 130, blocking most of the non-transmitted light, thereby reducing the influence of the non-transmitted light on the spectrum of the transmitted fruit. If the quality module 142 is arranged above or on a side surface of the fruit cup 130, more natural light and diffuse reflection light enter the quality module 142, such that the detection precision of the quality module 142 is influenced.

Secondly, by receiving the spectrum from the bottom of the fruit cup 130, any size of fruit can be lit from the middle of the fruit. It has good compatibility with large fruit and small fruit, and can be compatible with fruit of different sizes. With the top receiving or side receiving method, large fruit will be lit at a lower part of the fruit, while small fruit will be lit at an upper part of the fruit. The compatibility is poor. Various sizes of fruit cups 130 need to be designed for fruit with large size differences. Some smaller fruit may even sink directly into the fruit cup 130, and even if the fruit cup 130 is changed to a smaller size, the light leakage is too severe to be detected.

Figure 5:
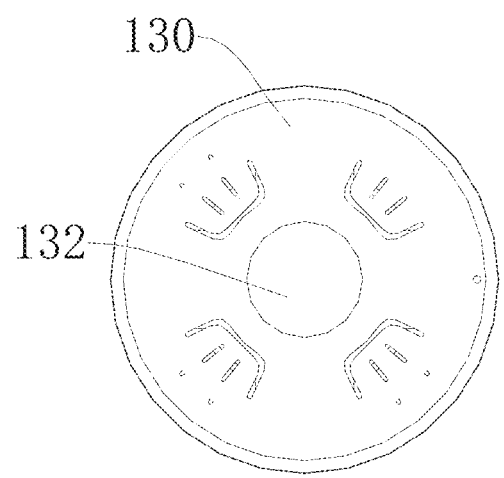
FIG. 5 is a schematic diagram of a structure of a fruit cup of a fruit sorting apparatus provided by an embodiment of the present disclosure.

Referring to FIG. 5, in this embodiment, the bottom of the fruit cup 130 may be provided with a detection hole 132, and the detection hole 132 may be arranged corresponding to the gap. The corresponding arrangement may be regarded as the projection of the detection hole 132 in the vertical direction coinciding with the gap. In order to improve the accuracy of the quality module 142 for receiving the spectrum, the detection hole 132 is arranged in the bottom of the fruit cup 130, so that the light transmission may be increased, and the phenomenon that the intensity of the spectrum received by the quality module 142 is weakened due to thicker fruit cups 130 is avoided.

In order to improve the quality of the spectrum received by the quality module 142, the detection hole 132 is arranged at a center of the fruit cup 130 as much as possible, so that the spectrum can pass through the detection hole 132 as much as possible.

In addition, a diameter of the detection hole 132 should not be too large. If the diameter of the detection hole 132 is too large and a diameter of the fruit is small, the fruit may fall from the detection hole 132. Therefore, the diameter of the detection hole 132 is adapted to the diameter of the fruit.

Similarly, the distance between the first chain 1245 and the second chain 1246 should not be too small or too large. If the distance between the first chain 1245 and the second chain 1246 is too large, the fixing assemblies 150 on the first chain 1245 and the second chain 1246 may not fix the fruit cup 130 conveniently, and if the distance between the first chain 1245 and the second chain 1246 is too small, the light source may not pass through the gap completely.

In this embodiment, the transmission chain 124 may further include a third transmission chain 1248, and an end of the third transmission chain 1248 may be arranged coaxially with an end that is of the second transmission chain 1244 and that is far away from the first transmission chain 1242.

In this embodiment, the first transmission chain 1242, the second transmission chain 1244 and the third transmission chain 1248 may be arranged sequentially, the input end may be arranged at an end that is of the first transmission chain 1242 and that is far away from the second transmission chain 1244, and the fruit cup 130 may be arranged on the input end and then be transmitted on the first transmission chain 1242, the second transmission chain 1244 and the third transmission chain 1248 sequentially.

The third transmission chain 1248 may also be a single chain, and a main purpose of providing the second transmission chain 1244 is to receive the spectrum from below the fruit cup 130. Since the double-chain mode is more costly than the single-chain mode, in this embodiment, only the double-chain mode is used for transmission at the detection of the quality module 142.

It is easily understood that, in this embodiment, the structures of the first transmission chain 1242 and the third transmission chain 1248 may be the same.

In this embodiment, the first transmission chain 1242 is coaxially connected to the second transmission chain 1244, one end that is of the second transmission chain 1244 and that is far away from the first transmission chain 1242 is coaxially connected to the third transmission chain 1248, the driving wheel 122 is in transmission connection with the first transmission chain 1242, the driving wheel 122 drives the first transmission chain 1242 to rotate, and the first transmission chain 1242 drives the second transmission chain 1244 to rotate through a transmission shaft connected to the second transmission chain 1244. Similarly, the second transmission chain 1244 drives the third transmission chain 1248 to rotate through a transmission shaft connected to the third transmission chain 1248, so as to realize the synchronous rotation of the first transmission chain 1242, the second transmission chain 1244 and the third transmission chain 1248.

In this embodiment, the detection unit 140 may further include a vision module 144 and a weighing module 146, wherein the vision module 144 and the weighing module 146 may be arranged below the first transmission chain 1242; and the fruit sorting apparatus 100 may further include a sorting module 148, wherein the sorting module 148 may be arranged below the third transmission chain 1248.

The vision module 144 may be mainly configured to collect image information of fruit, the weighing module 146 may be mainly configured to weigh the fruit, and the sorting module 148 may be mainly configured to obtain the overall data of the fruit after integrating the data of the quality module 142, the vision module 144 and the weighing module 146, and then sort the grades of the fruit according to the integrated overall data.

Figure 6:
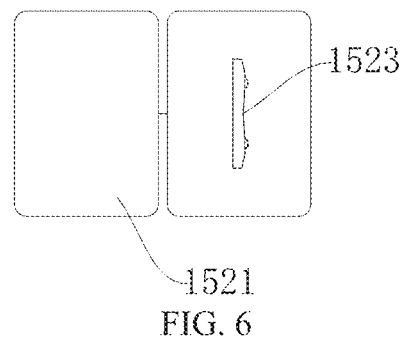
FIG. 6 is a schematic diagram of a structure of a first fixing member of a fruit sorting apparatus provided by an embodiment of the present disclosure.
Figure 7:
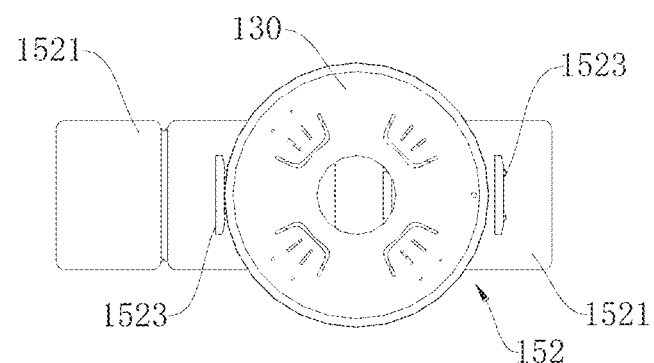
FIG. 7 is a schematic diagram of a structure of a first fixing member of a fruit sorting apparatus provided by an embodiment of the present disclosure for fixing a fruit cup.

Referring to FIGS. 6 and 7, in this embodiment, the structures of the first transmission chain 1242 and the third transmission chain 1248 are the same. The structure of the second transmission chain 1244 is different from the structures of the first transmission chain 1242 and the third transmission chain 1248. The structure of the fixing assembly 150 on the first transmission chain 1242 is the same as the structure of the fixing assembly 150 on the third transmission chain 1248, and the fixing assembly 150 on the second transmission chain 1244 is in another structure. In order to distinguish two different fixing assemblies 150, the fixing assemblies 150 on the first transmission chain 1242 and the third transmission chain 1248 are defined as a first fixing member 152, and the fixing assembly 150 on the second transmission chain 1244 is defined as a second fixing member 154.

In this embodiment, the fixing assembly 150 may include a bottom plate 1521 and a baffle plate 1523, the bottom plate 1521 may be mounted on the conveying assembly 120, the baffle plate 1523 may be connected to the bottom plate 1521, the baffle plates 1523 and the bottom plates 1521 of two adjacent fixing assemblies 150 may form a fixing cavity, and the fruit cup 130 may be mounted in the fixing cavity.

In this embodiment, the first fixing member 152 includes a bottom plate 1521 and a baffle plate 1523, the bottom plate 1521 is mounted on the first transmission chain 1242 or the third transmission chain 1248, and the fruit cup 130 is placed in the fixing cavity. In the process of conveying the fruit cups 130 by the first transmission chain 1242 or the third transmission chain 1248, the bottom plate 1521 is mainly configured to bear the fruit cups 130, and the baffle plates 1523 of two adjacent first fixing members 152 limit the fruit cups 130 from the front and the back of the fruit cups 130, such that the fruit cups 130 may be ensured to run on the first transmission chain 1242 or the third transmission chain 1248.

In order to improve the limiting effect of the baffle plate 1523 on the fruit cup 130, the baffle plate 1523 may be arranged perpendicular to the bottom plate 1521.

Certainly, in other embodiments of the present disclosure, the baffle plate 1523 may be arranged at other included angles with the bottom plate 1521, as long as the fruit cup 130 can be limited.

Figure 8:
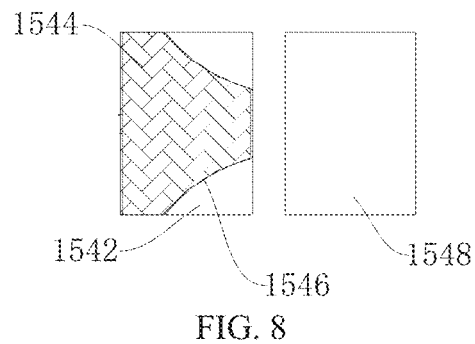
FIG. 8 is a schematic diagram of a structure of a second fixing member of a fruit sorting apparatus provided by an embodiment of the present disclosure.
Figure 9:
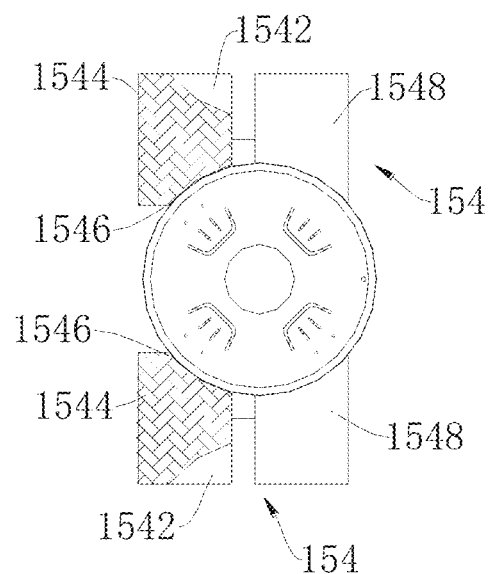
FIG. 9 is a schematic diagram of a structure of a second fixing member of a fruit sorting apparatus provided by an embodiment of the present disclosure for fixing a fruit cup.

Referring to FIGS. 8 and 9, in this embodiment, the fixing assembly 150 may include a mounting plate 1542 and a stopper 1544, the mounting plate 1542 may be mounted on the conveying assembly 120, the stopper 1544 may be connected to the mounting plate 1542, and the stopper 1544 can abut against the fruit cup 130, so that the fruit cup 130 moves under the driving of the conveying assembly 120.

In this embodiment, the second fixing member 154 includes a mounting plate 1542 and a stopper 1544, the mounting plate 1542 is mounted on the second transmission chain 1244, and the stopper 1544 is mainly configured to abut against the fruit cup 130, so as to drive the fruit cup 130 to move on the second transmission chain 1244.

It should be noted that, in this embodiment, the first chain 1245 and the second chain 1246 of the second transmission chain 1244 are both provided with the second fixing members 154, and the second fixing members 154 on the first chain 1245 are arranged in one-to-one correspondence with the second fixing members 154 on the second chain 1246. That is, the second fixing member 154 of the first chain 1245 and the second fixing member 154 of the second chain 1246 at the same position cooperate to fix the fruit cup 130.

That is, the two second fixing members 154 at the same position fix the fruit cup 130 from different positions of the fruit cup 130, and push the fruit cup 130 to move on the second transmission chain 1244.

The distance between the first fixing members 152 on the first transmission chain 1242 may be the same as the distance between the second fixing members 154 on the second transmission chain 1244. When the first fixing member 152 moves to the transmission shaft of the first transmission chain 1242 and the second transmission chain 1244, the second fixing member 154 on the second transmission chain 1244 just rotates from below the second transmission chain 1244 to above the second transmission chain 1244, during the rotation at the same speed, the first fixing member 152 gradually rotates to below the first transmission chain 1242, and the stopper 1544 of the second fixing member 154 gradually contacts the fruit cup 130, so that the fruit cup 130 can transition from the first transmission chain 1242 to the second transmission chain 1244.

In this embodiment, the gaps between the first transmission chain 1242 and the second transmission chain 1244 and between the third transmission chain 1248 and the second transmission chain may be correspondingly set, so as to avoid the interference between the first fixing member 152 and the second fixing member 154 when the fruit cup 130 transits from the first transmission chain 1242 to the second transmission chain 1244 and transits from the second transmission chain 1244 to the third transmission chain 1248.

In this embodiment, the stopper 1544 may have a stop surface 1546, and the stop surface 1546 may abut against the fruit cup 130. During the transition of the fruit cup 130 from the first transmission chain 1242 to the second transmission chain 1244, the stop surface 1546 gradually abuts against the fruit cup 130, thereby pushing the fruit cup 130 to move on the second transmission chain 1244.

In this embodiment, a shape of the stop surface 1546 may be adapted to that of the fruit cup 130, which can ensure that the stop surface 1546 and the fruit cup 130 can fit perfectly, improve the transmission stability of the fruit cup 130 during the transmission process, and reduce the sliding of the fruit cup 130 due to local contact between the stop surface 1546 and the fruit cup 130.

For example, when the fruit cup 130 has a circular shape, the stop surface 1546 also has a circular shape. When the fruit cup 130 has a rectangular shape, the stop surface 1546 also has a rectangular shape, as long as the stop surface 1546 can perfectly fit the fruit cup 130.

In this embodiment, in order to increase the contact area between the whole second fixing member 154 and the bottom of the fruit cup 130, the second fixing member 154 may further include a connecting plate 1548, and the connecting plate 1548 may be mounted on the second transmission chain 1244 and spaced apart from the mounting plate 1542.

In this embodiment, when the fruit cup 130 is on the first transmission chain 1242, two adjacent first fixing members 152 clamp the fruit cup 130, when the fruit cup 130 moves to the transmission shafts of the first transmission chain 1242 and the second transmission chain 1244, the baffle plate 1523 of the first fixing member 152 that is on the first transmission chain 1242 and that fixes the front of the fruit cup 130 gradually moves to below the first transmission chain 1242, so as to be separated from the fruit cup 130, and the stop surface 1546 of the second transmission chain 1244 moves to fit the fruit cup 130, so as to push the fruit cup 130 to transmit on the second transmission chain 1244. When the fruit cup 130 moves to the transmission shafts of the second transmission chain 1244 and the third transmission chain 1248, similarly, the first fixing member 152 on the third transmission chain 1248 is transmitted to a connection between the second transmission chain 1244 and the second transmission chain 1244, and the fruit cup 130 is limited in front of the fruit cup 130, so that the fruit cup 130 is prevented from being separated from the third transmission chain 1248. In the process of continuing transmission, the second fixing member 154 of the second transmission chain 1244 gradually rotates to below the second transmission chain 1244, and the other first fixing member 152 of the third transmission chain 1248 rotates to above the third transmission chain 1248, so as to fix the fruit cup 130.

Figure 10:
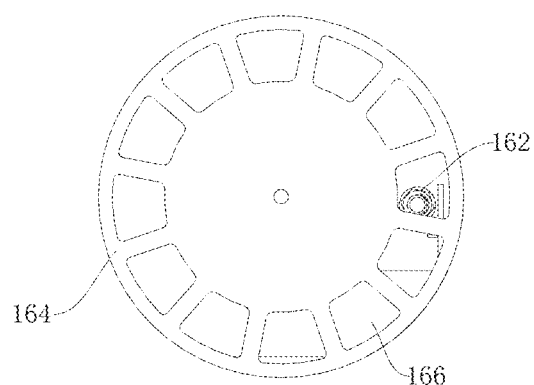
FIG. 10 is a schematic diagram of a structure of a detection assembly of a fruit sorting apparatus provided by an embodiment of the present disclosure.

Referring to FIG. 10, in the embodiment, the detection assembly 160 may include a detection switch 162 and a detection tray 164, the detection tray 164 may be arranged coaxially with the conveying assembly 120, a plurality of detection ports 166 may be arranged on the detection tray 164, the number of the detection ports 166 may be the same as that of the fixing assemblies 150, and the detection switch 162 may detect an in-place signal indicating that the fixing assembly 150 moves to the input end under a condition that the detection port 166 moves to a position corresponding to the detection switch 162.

In this embodiment, since the conveying assembly 120 includes a first transmission chain 1242, a second transmission chain 1244 and a third transmission chain 1248, and the detection assembly 160 is arranged on the first transmission chain 1242, the number of the detection ports 166 needs to be the same as that of the first fixing members 152 of the first transmission chain 1242. The detection tray 164 is arranged coaxially with an end that is of the first transmission chain 1242 and that is far away from the second transmission chain 1244.

The detection switch 162 may be photoelectric switch, and when the detection port 166 rotates to a detection port 166, the signal sent by the photoelectric switch can be emitted from the detection port 166. When the detection tray 164 rotates to a gap between the two detection ports 166, the photoelectric switch receives a feedback signal. Therefore, it can be determined whether any detection port 166 passes through the detection switch 162, and based on the result that whether the detection port 166 moves to the detection switch 162, it can be determined whether the fixing assembly 150 moves to the input end.

The working principle of the fruit sorting apparatus 100 provided by this embodiment is as follows: in this embodiment, after the running speed of the conveying assembly 120 is obtained, the movement time required for the fixing assembly 150 to move from the input end to the detection unit 140 can be calculated according to the running speed and the distance between the detection unit 140 and the detection assembly 160, the end point time for the fixing assembly 150 to move to the detection unit 140 can be calculated according to the start point time obtained by the fixing assembly 150 at the input end, the end point time can be obtained by adding the movement time to the start point time, and the detection information whose time information is the same as the end point time can be matched among a plurality of pieces of detection information according to the end point time, where the detection information is the detection information of the fruit cup 130 detected by the detection unit 140 when the fixing assembly 150 moves to the detection unit 140.

In summary, according to the fruit sorting apparatus 100 provided in this embodiment, the fruit is placed in the fruit cup 130, the fruit cup 130 is fixed on the fixing assembly 150, and under the action of the conveying assembly 120, the fixing assembly 150 drives the fruit cup 130 to sequentially pass through a plurality of detection units 140 arranged in an extension direction of the conveying assembly 120. A position where the input end and the fruit cup 130 are placed at the fixing assembly 150 may be considered as a start point of the fruit cup 130 moving on the conveying assembly 120. Acquiring the in-place signal of the fixing assembly 150 moving to the input end may be regarded as acquiring a start point time of the fixing assembly 150 driving the fruit cup 130 to move on the conveying assembly 120. The detection information that corresponds to the fruit cup 130 of the in-place signal and that is detected at the detection unit 140 may be matched according to the start point time, the running speed and the distance between the detection unit 140 and the detection assembly 160. In this embodiment, according to the start point time, the running speed, the distance between the detection unit 140 and the detection assembly 160, and time information, it is possible to realize matching between the fruit cup 130 and detection information, realizing one-to-one correspondence between a plurality of pieces of detection information and a plurality of fruit cups 130, so as to avoid the influence of the loss of fruit cups 130 on subsequent sorting, and reduce the problem of disorder of subsequent data as much as possible, thereby improving the precision of fruit sorting.

Another embodiment of the present disclosure will be described, and this embodiment provides a fruit sorting method. The fruit sorting method provided in this embodiment can match a plurality of pieces of detection information with the fruit cups 130 after receiving the detection information of the fruit cups 130 detected by the detection units 140, so as to reduce the problem of disorder of subsequent data as much as possible, thereby improving the precision of fruit sorting.

For a brief description, reference may be made to the foregoing embodiments of the fruit sorting apparatus of the present disclosure for matters not mentioned in this embodiment.

Specific steps of the fruit sorting method are as follows.

Figure 11:
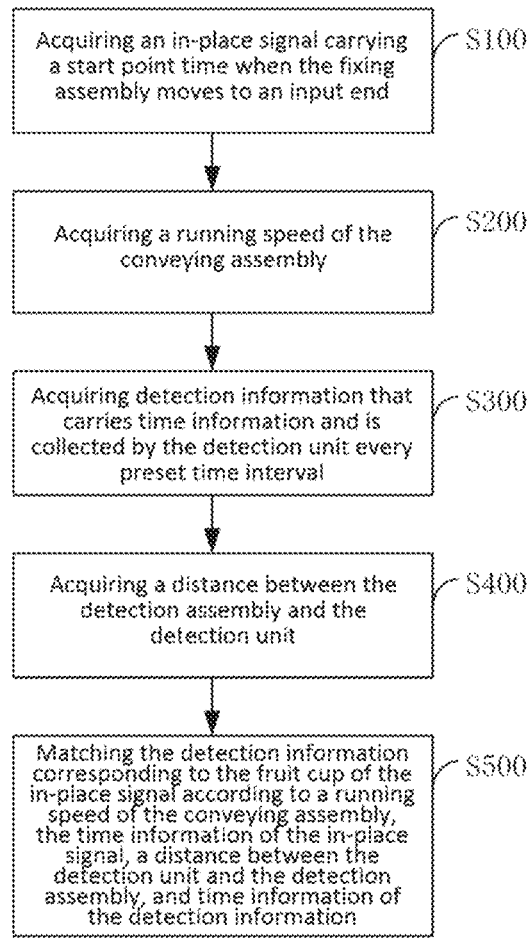
FIG. 11 is a flow chart of a fruit sorting method provided by another embodiment of the present disclosure.

Referring to FIG. 11, step S100: acquiring an in-place signal carrying a start point time when the fixing assembly 150 moves to an input end.

In this embodiment, the in-place signal carrying the start point time may refer to a time point when the detection assembly 160 detects the in-place signal of the fixing assembly 150 and records the detected in-place signal, and the time point when the in-place signal is detected is the start point time of the in-place signal.

Step S200: acquiring a running speed of a conveying assembly 120.

In this embodiment, the running speed may be preset, or the control unit 110 may obtain the running speed directly from the conveying assembly 120. When the entire fruit sorting apparatus 100 is started, the control unit 110 may control the conveying assembly 120 to convey the fruit cup 130 at the running speed according to the starting instruction. The control unit 110 may also directly detect the running speed of the conveying assembly 120 after the fruit sorting apparatus 100 is started.

Step S300: acquiring detection information that carries time information and is collected by the detection unit 140 every preset time interval.

In this embodiment, the detection information carrying time information may mean that the detection unit 140 simultaneously records the time point when the detection information is detected when detecting the detection information of the fruit cup 130, then the time point when the detection information is detected is the time information of the detection information.

The plurality of fixing assemblies 150 are spaced and arranged on the conveying assembly 120, an interval time between two adjacent fixing assemblies 150 passing through the detection unit 140 may be calculated according to the running speed of the conveying assembly 120 and the distance between the two adjacent fixing assemblies 150, and the interval time may be set to a preset time, that is to say, the detection unit 140 collects detection information once when each fixing assembly 150 moves to the detection unit 140.

Step S400: acquiring a distance between the detection assembly 160 and the detection unit 140.

In this embodiment, the plurality of fixing assemblies 150 are evenly spaced and arranged on the conveying assembly 120, the distance between the fixing assemblies 150 is constant, and the distance between the detection assembly 160 and the detection unit 140 can be calculated according to the number of the fixing assemblies 150 between the detection assembly 160 and the detection unit 140.

Step S500: matching the detection information corresponding to the fruit cup 130 of the in-place signal according to a running speed of the conveying assembly 120, the time information of the in-place signal, a distance between the detection unit 140 and the detection assembly 160, and time information of the detection information.

In this embodiment, according to the start point time, the running speed, the distance between the detection unit 140 and the detection assembly 160, and time information, it is possible to realize matching between the fruit cup 130 and detection information, realizing one-to-one correspondence between a plurality of pieces of detection information and a plurality of fruit cups 130, so as to avoid the influence of the loss of fruit cups 130 on subsequent sorting, and reduce the problem of disorder of subsequent data as much as possible, thereby improving the precision of fruit sorting.

Figure 12:
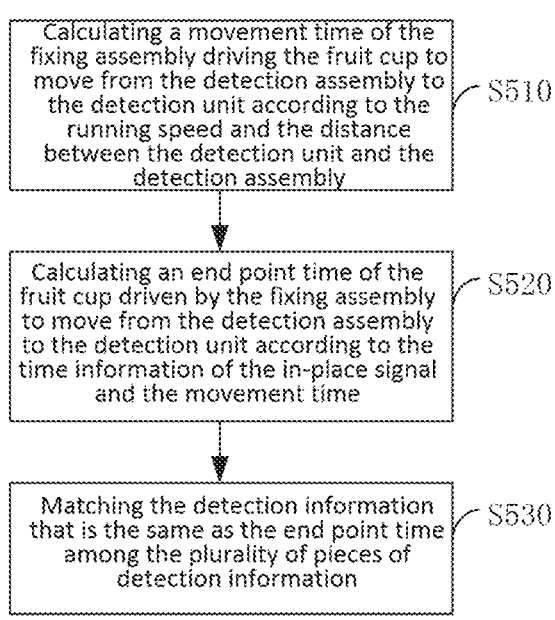
FIG. 12 is a flow chart of sub-steps of step S500 of the fruit sorting method provided by an embodiment of the present disclosure.

Referring to FIG. 12, the step S500 may include step S510, step S520 and step S530.

Step S510: calculating a movement time of the fixing assembly 150 driving the fruit cup 130 to move from the detection assembly 160 to the detection unit 140 according to the running speed and the distance between the detection unit 140 and the detection assembly 160.

In this embodiment, after the running speed of the conveying assembly 120 is acquired, the movement time required for the fixing assembly 150 to move from the input end to the detection unit 140 can be calculated according to the running speed and the distance between the detection unit 140 and the detection assembly 160.

Step S520: calculating an end point time of the fruit cup 130 driven by the fixing assembly 150 to move from the detection assembly 160 to the detection unit 140 according to the time information of the in-place signal and the movement time.

The end point time for the fixing assembly 150 to move to the detection unit 140 can be calculated according to the start point time obtained by the fixing assembly 150 at the input end, and the end point time can be obtained by adding the movement time to the start point time.

Step S530: matching the detection information that is the same as the end point time among the plurality of pieces of detection information.

The detection information whose time information is the same as the end point time can be matched among a plurality of pieces of detection information according to the end point time, where the detection information is the detection information of the fruit cup 130 detected by the detection unit 140 when the fixing assembly 150 moves to the detection unit 140.

Figure 13:
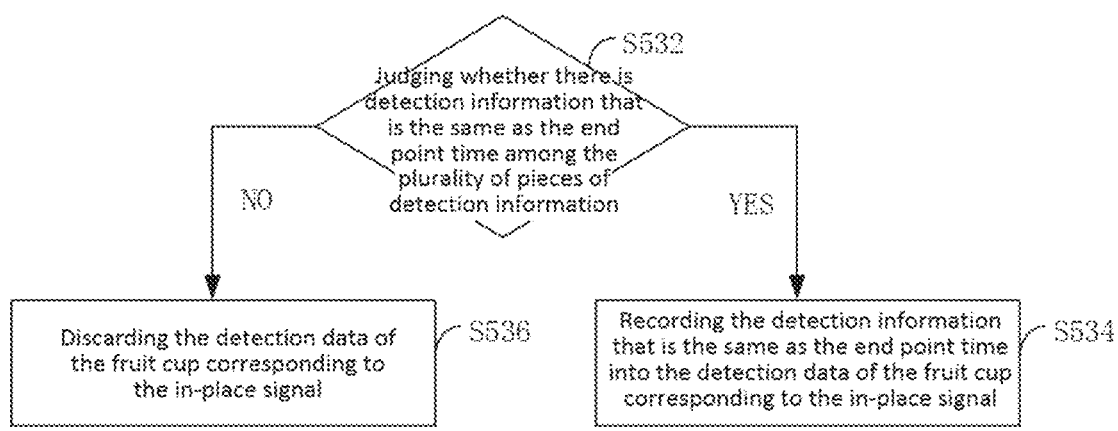
FIG. 13 is a flow chart of sub-steps of step S530 of the fruit sorting method provided by an embodiment of the present disclosure.

Referring to FIG. 13, the step S530 may include step S532, step S534 and step S536.

Step S532: judging whether there is detection information that is the same as the end point time among the plurality of pieces of detection information.

In this embodiment, the detection unit 140 may collect one piece of detection information every preset time interval and send the detection information carrying time information to the control unit 110, the control unit 110 matches detection information that is the same as the end point time among a plurality of pieces of detection information.

Step S534: if there is the detection information, recording the detection information that is the same as the end point time into the detection data of the fruit cup 130 corresponding to the in-place signal.

If there is the detection information that is the same as the end point time, the detection information is detection data of the fruit cup 130, and the detection information is recorded in the detection data of the fruit cup 130.

Step S536: if there is no detection information, discarding the detection data of the fruit cup 130 corresponding to the in-place signal.

If there is no detection information matching the end point time among the plurality of pieces of detection information, the fruit cup 130 may be lost in the process of moving to the detection unit 140, or the fruit cup 130 is not lost, but the detection unit 140 does not detect the detection information of the fruit cup 130, which indicates that there is no detection information of the fruit cup 130 among the plurality of pieces of detection information, the detection data of the fruit cup 130 is discarded, and the next sorting work is not performed.

For example: the distance between the vision module 144 and the detection assembly 160 is X fixing assemblies 150, the distance between the weighing module 146 and the detection assembly 160 is Y fixing assemblies 150, the distance between the quality module 142 and the detection assembly 160 is Z fixing assemblies 150, and the distance between the sorting module and the detection assembly is M fixing assemblies 150.

For each movement of the detection assembly 160 to the fixing assembly 150, the detection assembly 160 detects an in-place signal and transmits the in-place signal to the control unit 110, and the control unit 110 can obtain a detection data from the vision module 144, the weighing module 146 and the quality module 142.

When the in-place signal is N, the data outputted by the vision module 144 is An, the data outputted by the weighing module 146 is Bn, and the output outputted by the quality module 142 is Cn.

After the fruit sorting method provided by this embodiment is used for integration, the in-place signal of a certain fixing assembly 150 is N, the data corresponding to the vision module 144, the weighing module 146 and the quality module 142 should be An+X, Bn+Y, and Cn+Z respectively. The three data are integrated into Dn and sent to the sorting module 148, and the sorting module 148 performs grade sorting according to Dn.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

The present disclosure discloses a fruit sorting apparatus and method, and relates to the technical field of fruit sorting. The fruit sorting apparatus includes: a control unit, a conveying assembly, a detection assembly, a fruit cup, a plurality of fixing assemblies and a plurality of detection units, where the control unit is configured to receive a plurality of pieces of detection information, and match detection information corresponding to a fruit cup of an in-place signal according to a running speed of the conveying assembly, a start point time of an in-place signal, a distance between the detection unit and the detection assembly, and time information of the detection information. In this embodiment, according to the start point time, the running speed, the distance between the detection unit and the detection assembly, and time information, it is possible to realize matching between the fruit cup and detection information, realizing one-to-one correspondence between a plurality of pieces of detection information and a plurality of fruit cups, so as to avoid the influence of the loss of fruit cups on subsequent sorting, and reduce the problem of disorder of subsequent data as much as possible, thereby improving the precision of fruit sorting.

In addition, it should be understood that the fruit sorting apparatus and method of the present disclosure are reproducible and can be applied to a variety of industrial applications. For example, the fruit sorting apparatus of the present disclosure can be applied to the field of fruit sorting.

What is claimed is:

1. A fruit sorting apparatus for sorting fruit, wherein the fruit sorting apparatus comprises:
a control unit, a conveying assembly, a detection assembly, a fruit cup, a plurality of fixing assemblies and a plurality of detection units, wherein the fruit cup is configured to accommodate a fruit;
the fixing assembly is configured to fix the fruit cup;
the detection assembly is arranged at an input end of the conveying assembly, and the detection assembly is connected to the control unit and is configured to detect an in-place signal when the fixing assemblies move to the input end and send the in-place signal carrying a start point time to the control unit;
the plurality of fixing assemblies are sequentially mounted on the conveying assembly, and drive a plurality of fruit cups to sequentially pass through the plurality of detection units under an action of the conveying assembly;
the plurality of detection units are connected to the control unit, and the detection units are configured to collect detection information of the fruit cup once every preset time interval and send the detection information carrying time information to the control unit; and
the control unit is configured to be connected to the detection units and the detection assembly, and is configured to receive a plurality of pieces of detection information and match the detection information corresponding to the fruit cup of the in-place signal according to a running speed of the conveying assembly, the start point time of the in-place signal, a distance between the detection units and the detection assembly, and the time information of the detection information;
wherein each of the fixing assemblies comprise a bottom plate and a baffle plate, the bottom plate is mounted on the conveying assembly, the baffle plate is connected to the bottom plate, the baffle plates and the bottom plates of two adjacent fixing assemblies form a fixing cavity, and the fruit cup is mounted in the fixing cavity.

2. The fruit sorting apparatus according to claim 1, wherein the control unit is further configured to calculate a movement time of the fixing assemblies driving the fruit cup to move from the detection assembly to the detection units according to the running speed and the distance between the detection units and the detection assembly, calculate an end point time of the fixing assemblies moving to the detection units according to the start point time of the in-place signal and the movement time, and match detection information whose time information is the same as the end point time.

3. The fruit sorting apparatus according to claim 2, wherein when the detection information matching the end point time exists among the plurality of pieces of detection information, the detection information is recorded into detection data of the fruit cup corresponding to the in-place signal.

4. The fruit sorting apparatus according to claim 2, wherein when no detection information matching the end point time exists among the plurality of pieces of detection information, detection data of the fruit cup corresponding to the in-place signal is discarded.

5. The fruit sorting apparatus according to claim 1, wherein the conveying assembly comprises a transmission chain and a driving wheel, the transmission chain is in transmission connection with the driving wheel, and the plurality of fixing assemblies are sequentially mounted on the transmission chain.

6. The fruit sorting apparatus according to claim 5, wherein the transmission chain comprises a first transmission chain and a second transmission chain, an end that is of the first transmission chain and that is far away from the input end is coaxially arranged with an end of the second transmission chain, the second transmission chain comprises a first chain and a second chain, and the first chain and the second chain are arranged in parallel and spaced apart to form a gap.

7. The fruit sorting apparatus according to claim 6, wherein the detection units comprise a quality module, and the quality module is arranged below the gap.

8. The fruit sorting apparatus according to claim 7, wherein a bottom of the fruit cup is provided with a detection hole, and the detection hole is arranged corresponding to the gap.

9. The fruit sorting apparatus according to claim 6, wherein the transmission chain further comprises a third transmission chain, and an end of the third transmission chain is arranged coaxially with an end that is of the second transmission chain and that is far away from the first transmission chain.

10. The fruit sorting apparatus according to claim 9, wherein the detection units further comprise a vision module and a weighing module, and the vision module and the weighing module are arranged below the first transmission chain.

11. The fruit sorting apparatus according to claim 10, wherein the fruit sorting apparatus further comprises a sorting module, and the sorting module is arranged below the third transmission chain.

12. The fruit sorting apparatus according to claim 1, wherein each of the fixing assemblies comprises a mounting plate and a stopper, the mounting plate is mounted on the conveying assembly, the stopper is connected to the mounting plate, and the stopper can abut against the fruit cup, so that the fruit cup moves under driving of the conveying assembly.

13. The fruit sorting apparatus according to claim 12, wherein the stopper has a stop surface, and the stop surface abuts against the fruit cup.

14. The fruit sorting apparatus according to claim 13, wherein a shape of the stop surface is adapted to that of the fruit cup.

15. The fruit sorting apparatus according to claim 1, wherein the detection assembly comprises a detection switch and a detection tray, the detection tray is arranged coaxially with the conveying assembly, a plurality of detection ports are arranged on the detection tray, the number of the detection ports is the same as that of the fixing assemblies, and the detection switch detects an in-place signal indicating that the fixing assemblies move to the input end under a condition that the detection ports move to a position corresponding to the detection switch.

* * * * *